US00H002240H

(19) United States

(12) Statutory Invention Registration

Davis et al.

(10) Reg. No.: US H2240 H

(43) Published: May 4, 2010

(54) MEMBRANE ELECTRODE ASSEMBLIES

(76) Inventors: Michael T Davis, 2623 Lurio Crescent, Port Coquitlam, BC (CA), V3B 7Z9; Francine Berretta, 7877 Heather Street, Vancouver, BC (CA), V6P 3R6; Siyu Ye, 5683 Oakland Street, Burnaby, BC (CA), V5H 1S2; Bien H Chiem, 7281 - 11th Avenue, Burnaby, BC (CA), V3N 2M9; Goran R Vlajnic, #335 - 6198 Kathleen Avenue, Burnaby, BC (CA), V5H 2S7; Bruce Lin, #12 - 784 Thurlow Street, Vancouver, BC (CA), V6E 1V9

(21) Appl. No.: 11/408,359

(22) Filed: Apr. 21, 2006

Related U.S. Application Data

(60) Provisional application No. 60/674,036, filed on Apr. 22, 2005.

(51) Int. Cl.
*H01M 4/00* (2006.01)

(52) U.S. Cl. ..... 429/42; 429/40; 429/30; 429/43

(58) Field of Classification Search ..... 429/42, 429/40, 30, 43

See application file for complete search history.

*Primary Examiner*—Michelle Clement

(74) *Attorney, Agent, or Firm*—Seed IP Law Group PLLC

(57) ABSTRACT

Performance in solid polymer electrolyte fuel cells can be improved by varying the characteristics of the ionomer used in the electrode of a membrane electrode assembly. For instance, increasing the ionomer to catalyst ratio can allow for improved performance under drier operating conditions (e.g., when less humidified reactants or higher operating temperatures are used) or when starting up in below freezing conditions.

3 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MEMBRANE ELECTRODE ASSEMBLIES

CROSS-REFERENCE TO RELATED APPLICATION

This application claims the benefit under 35 U.S.C. §119 (e) of U.S. Provisional Patent Application No. 60/674,036 filed Apr. 22, 2005, which is incorporated herein by reference in its entirety.

BACKGROUND OF THE INVENTION

1. Field of the Invention

The invention relates to improved membrane electrode assemblies for solid polymer electrolyte fuel cells and, in particular, to electrode formulations for catalyst coated membrane assemblies that result in improved performance characteristics.

2. Description of the Related Art

Fuel cell systems are presently being developed for use as power supplies in a wide variety of applications, such as stationary power plants and portable power units. Such systems offer the promise of economically delivering power while providing environmental benefits.

Fuel cells convert fuel and oxidant reactants to generate electric power and reaction products. They generally employ an electrolyte disposed between cathode and anode electrodes. A catalyst typically induces the desired electrochemical reactions at the electrodes. A preferred fuel cell type, particularly for portable and motive applications, is the solid polymer electrolyte (SPE) fuel cell which comprises a solid polymer electrolyte membrane and operates at relatively low temperatures.

SPE fuel cells employ a membrane electrode assembly (MEA) which comprises the solid polymer electrolyte or ion-exchange membrane disposed between the cathode and anode. Each electrode contains a catalyst layer, comprising an appropriate catalyst, located next to the solid polymer electrolyte membrane. The catalyst is typically a precious metal composition (e.g., platinum metal black or an alloy thereof) and may be provided on a suitable support (e.g., fine platinum particles supported on a carbon black support). The catalyst layers may contain an ionomer similar to that used for the solid polymer electrolyte membrane (e.g., Nafion®). Porous, electrically conductive substrates are typically employed adjacent to the electrodes for purposes of mechanical support, electrical conduction, and/or reactant distribution. These substrates thus serve as fluid diffusion layers.

MEAs can be fabricated by first applying a catalyst layer to a porous, electrically conductive substrate to form a fluid diffusion electrode. The fluid diffusion layer is then bonded to the membrane electrolyte. Alternatively, the catalyst layer may be applied directly to the membrane electrolyte instead to form what is known as a catalyst coated membrane. Either approach may be used for either or both electrodes in making an MEA.

An SPE fuel cell also typically employs flow field plates for directing the reactants across one surface of each electrode or electrode substrate. The flow field plates are disposed on each side of the MEA. In operation, the output voltage of an individual fuel cell under load is generally below one volt. Therefore, in order to provide greater output voltage, numerous cells are usually stacked together and are connected in series to create a higher voltage fuel cell series stack.

During normal operation of an SPE fuel cell, fuel is electrochemically oxidized at the anode catalyst, typically resulting in the generation of protons, electrons, and possibly other species depending on the fuel employed. The protons are conducted from the reaction sites at which they are generated, through the electrolyte, to electrochemically react with the oxidant at the cathode catalyst. The electrons travel through an external circuit providing useable power and then react with the protons and oxidant at the cathode catalyst to generate water reacton product.

While significant advances have been made in this field, there remains a need for improved electrode assemblies.

BRIEF SUMMARY OF THE INVENTION

The performance of SPE fuel cells can be improved in certain ways by varying the ionomer characteristics in the component electrodes. Up to a point, it is expected that increasing the water content associated with the ionomer in the catalyst layer can allow for improved performance under drier operating conditions or during startup from below freezing temperatures. The water content may be increased by increasing the amount of ionomer relative to the amount of catalyst. For instance, the ionomer content may be increased such that the weight ratio of ionomer to catalyst is from about 15:85 (wt. %:wt. %) to about 55:45 (wt. %: wt. %). Alternatively or in addition, the water content may be increased by employing an ionomer in the catalyst layer with a lower equivalent weight.

The electrode formulations are suited for use in a membrane electrode assembly comprising a catalyst coated membrane. In particular, the electrode formulations are suited for use in the cathode electrode.

DETAILED DESCRIPTION OF THE INVENTION

In one preferred embodiment, an SPE fuel cell stack comprises fuel cells in which a greater amount of ionomer and/or an ionomer having lower equivalent weight is employed in the cathode electrodes. The ionomer in the cathode layers thus has greater water content during operation. This helps keep the membrane electrolyte hydrated, and thus maintains the electrolyte conductivity when the fuel cell stack is operating under relatively dry conditions. Further, the ionomer in the catalyst layer takes up otherwise free water, and thus minimizes ice formation in the cathode layer when operated at subzero temperatures. This improves operation during subsequent startup and reduces the time it takes to reach normal operating temperature.

The membrane electrode assemblies may comprise catalyst coated membranes in which the cathode has been applied directly to the membrane. Anodes can be prepared separately as gas diffusion electrodes. The gas diffusion anodes and gas diffusion layers for the cathodes can then be bonded to the cathode catalyst coated membranes to form complete membrane electrode assemblies.

The cathode layer may be applied onto the membrane in ink form using a suitable coating technique (e.g., a decal transfer method). The cathode ink comprises a conventional carbon supported cathode catalyst, ionomer, and other optional materials such as binders or pore formers which are suspended (or dissolved) in a suitable liquid carrier. For instance, the catalyst can be 50% Pt supported on carbon (e.g., catalyst supplied by Tanaka KK or Engelhard). The ionomer, for example, can be Nafion® perfluorosulfonic acid, BAM® trifluorostyrene, or ionomer as used in Gore® Series 57 MEAs. Additional binders (such as PTFE, FEP, or other plastics) and/or pore forming materials (such as ammonium bicarbonate, camphor, PVP) may be included in the ink. The membrane electrolyte on which the ink is applied can be of the same type as the ionomer in the cathode ink, or alternatively can be a different one of various suitable ionically conducting polymers.

The amount and type of ionomer used in the cathode layer is such that the water content is increased over that found in a conventional cathode catalyst coated membrane. However, excessive ionomer in the catalyst layer can lead to "flooding" issues (when liquid water hinders access of gases to/from the catalyst). A suitable range for ionomer content is from about 15:85 to about 55:45 (ionomer wt. %:catalyst wt. %). In a typical fuel cell with a Pt catalyst loading of about 0.4 mg Pt/cm$^2$, the ionomer content will range from about 0.07 to 0.5 mg ionomer/cm$^2$. Alternatively, an ionomer with lower equivalent weight may be employed such that similar water containing capability is obtained without necessarily increasing the amount of ionomer used in the catalyst layer. The desired water content of the cathode catalyst layer, and hence the amount and type of ionomer used, is dependent to some extent on other aspects of the fuel cell design and its intended operation. However, for example, the desired ionomer amount for a given situation can readily be determined empirically.

Construction of the membrane electrode assembly is completed by bonding a gas diffusion layer (GDL) to the coated side and an anode gas diffusion electrode (GDE) to the uncoated side of the cathode catalyst coated membrane. The GDL can, for instance, be a porous, electrically conducting, carbon fibre paper such as those made by Toray Industries or Ballard Material Products. The anode GDE comprises a suitable anode catalyst composition (e.g., a composition selected for oxidizing fuel and also preferably for voltage reversal tolerance in fuel cell stacks) applied onto a similar carbon fibre paper.

The following examples are provided to illustrate certain aspects and embodiments of the invention and should not be construed as limiting in any way.

EXAMPLES

In the following, three single fuel cells designed for use in an automotive sized fuel cell stack were assembled and tested. The cathode and anode catalysts in each cell were carbon supported Pt (50% by weight) and carbon supported Pt/Ru (40%/20% by weight), respectively. Each electrode was prepared by applying catalyst inks onto polytetrafluoroethylene (PTFE) impregnated carbon fiber paper substrates from Toray Industries. The cathode and anode catalyst layers comprised approximately 0.7–0.75 mg Pt/cm$^2$ cathode and 0.3 mg Pt/cm$^2$ anode, respectively. NAFION® ionomer (1100 EW) was also used in each catalyst layer. However, the amount of ionomer present in the cathode catalyst layers varied from cell to cell as indicated below. Each MEA comprised a 25 μm thick membrane made of a different ionomer suitable for this application. Grafoil® graphite reactrant flow field plates with linear flow channels formed therein were located on either side of the MEAs, thereby completing the fuel cell assembly.

The stack was then operated under typical dry automotive conditions at 60° C. and the voltage outputs at several current densities were determined. In addition, for two of the cells, the start up time to reach 50% of nominal power output was determined from −15° C. (start up time for the other cell was not available. These results are provided in the following Table.

TABLE

| Fuel cell | Ionomer:catalyst (wt %:wt %) | Performance at 0.28 A/cm$^2$ | Performance at 1.3 A/cm$^2$ | Performance at 1.6 A/cm$^2$ | Start up time (sec) |
|---|---|---|---|---|---|
| A | 15:85 | 0.762 | 0.612 | 0.514 | NA |
| B | 23:77 | 0.775 | 0.621 | 0.528 | 54 |
| C | 33:67 | 0.782 | 0.634 | 0.539 | 50 |

As is evident from the preceding Table, performance of the fuel cells is improved, even under normal operating conditions, at ionomer to catalyst wt. % values up to 33:67. The start up time for fuel cell C (with a greater ionomer:catalyst ratio in the cathode) is less than that for fuel cell B. Electrodes comprising ionomer wt. %:catalyst wt. % amounts up to 45:55 and even 55:45 are also expected to provide acceptable or improved results.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. For instance, the ionomer characteristics may be varied in either of both electrodes. It may also be desirable to incorporate a gradient within an electrode (e.g., in which more ionomer is present in the catalyst layer adjacent the membrane than there is adjacent the gas diffusion layer). Further, the MEA may incorporate a catalyst coated membrane in which either or both electrodes were coated onto the membrane electrolyte. Different catalyst compositions, including admixtures, may also be employed, in differing amounts. These and other modifications are possible.

The invention claimed is:

1. A cathode catalyst for a fuel cell comprising a catalytic material and an ionomer, wherein the ionomer is present in an amount of at least 15 weight percent.

2. The cathode catalyst of claim 1 wherein the equivalent weight of the ionomer is less than about 1200.

3. A catalyst-coated membrane comprising the cathode catalyst of claim 1.

* * * * *